Sept. 19, 1961    E. F. THOMAS ET AL    3,000,677
PISTON RING EXPANDER
Filed Jan. 12, 1959
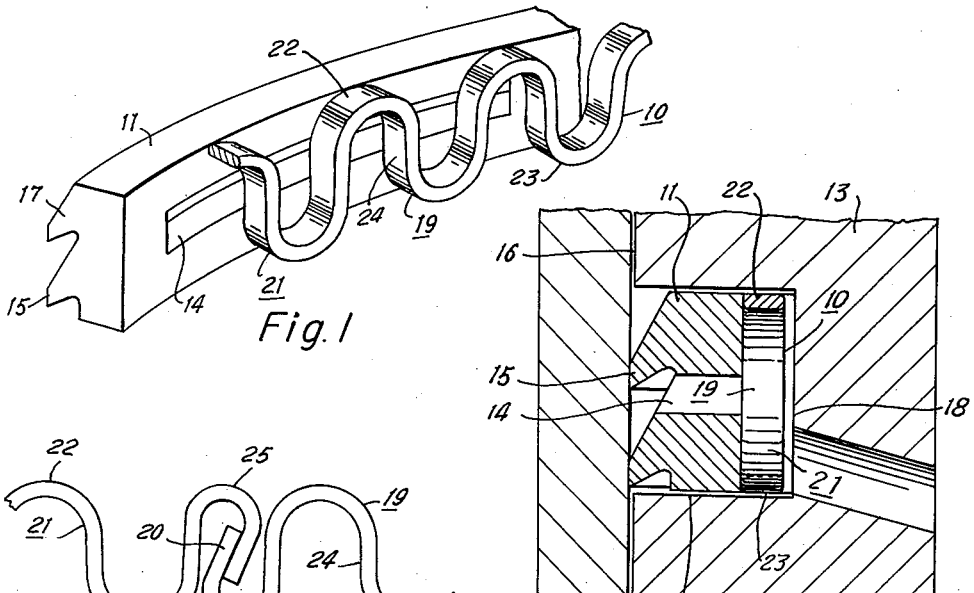
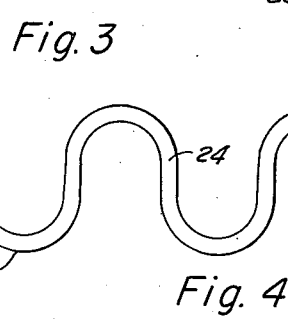
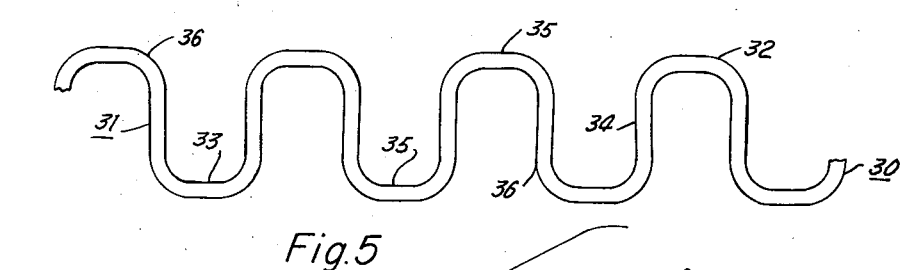
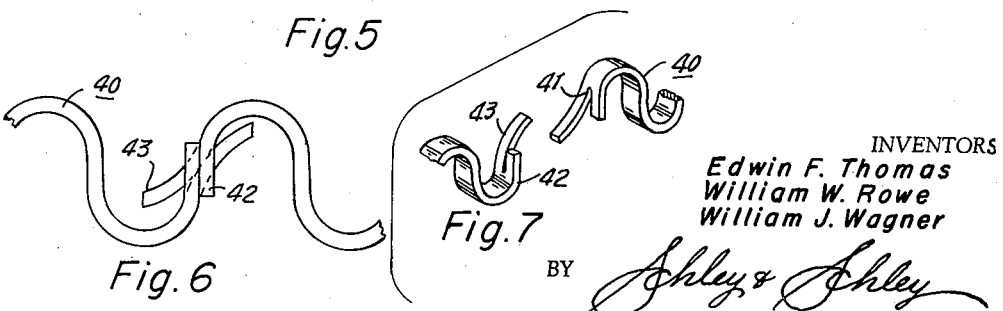
INVENTORS
Edwin F. Thomas
William W. Rowe
William J. Wagner
BY *Ashley & Ashley*
ATTORNEYS United States Patent Office 3,000,677
Patented Sept. 19, 1961

3,000,677
PISTON RING EXPANDER
Edwin F. Thomas, William W. Rowe, and William J. Wagner, Fort Worth, Tex., assignors to Double Seal Ring Company, Fort Worth, Tex., a corporation of Texas
Filed Jan. 12, 1959, Ser. No. 786,282
3 Claims. (Cl. 309—45)

This invention relates to new and useful improvements in piston ring expanders.

One object of the invention is to provide an improved expander of the axially corrugated, ribbon type which is designed for use with both compression and oil control piston rings in large marine and industrial internal combustion engines and particularly for use with replacement rings in slightly out of round and/or tapered cylinders.

A particular object of the invention is to provide an improved flexible, conformable expander for continuous contact with the inner periphery of a piston ring and capable of exerting a more uniform outward radial pressure against the inner periphery of the ring throughout its area for maintaining the entire outer periphery of said ring in sealing engagement with a cylinder wall.

An important object of the invention is to provide an improved piston ring expander, of the character described, which is circumferentially compressible, which is adapted to be freely confined within a piston ring groove without being dependent upon engagement with the bottom of the groove for exerting an outward radial thrust and which does not require a definite mathematical relationship between the radial dimensions of the expander and piston ring and the depth of said groove so long as said expander and ring have a combined radial thickness less than said groove depth.

Another object of the invention is to provide an improved piston ring expander, of the character described, which is designed to uniformly distribute an outward radial pressure throughout the circumference of a piston ring, which is especially beneficial when used with cast iron rings due to the long wearing properties inherent to such rings under considerable unit bearing pressure, and which causes piston rings to conform into the complete cylinder wall contact necessary to prevent undesirable blow-by past compression rings and to produce maximum lubrication control by oil control rings, whereby the economical operation of large engines and compressors is more readily obtainable.

A further object of the invention is to provide an improved piston ring expander, of the character described, which is in the form of an axially corrugated, annular ribbon of spring steel having a minimum height to pitch ratio of approximately 1 to 1.33 whereby the greater pitch in relation to the axial dimension or height of the expander reduces the obstruction to the free flow of oil through ventilated rings.

Another object of the invention is to provide an improved piston ring expander, of the character described, which has an axial dimension or height substantially equal to the axial width of the piston ring whereby the radial thrust exerted by the expander is applied equally to the upper and lower or radial portions of said ring and is uniformly distributed axially thereof.

A construction designed to carry out the invention will be hereinafter described, together with other features of the invention.

The invention will be more readily understood from a reading of the following specification and by reference to the accompanying drawing, wherein examples of the invention are shown, and wherein:

FIG. 1 is a perspective view of a portion of a piston ring and expander constructed in accordance with the invention, FIG. 2 is a transverse, vertical, sectional view of the expander and ring mounted in the ring groove of a piston with the ring engaging the wall of a cylinder, FIG. 3 is a side elevational view showing one way of overlapping the ends of the piston ring expander, FIG. 4 is a side elevational view of a portion of the expander, FIG. 5 is a view, similar to FIG. 4, of a modified expander, FIG. 6 is a view, similar to FIG. 3, showing the ends of the expander in hooked engagement, and FIG. 7 is a perspective view showing the hooked ends disengaged.

In the drawing, the numeral 10 designates a piston ring expander embodying the principles of the invention and adapted for use with the piston rings of internal combustion engines and compressors. Although universal in application, the expander 10 is particularly designed for marine and other engines having pistons of large diameter and more specifically to coact with flexible replacement rings which are installed in slightly out of round and/or tapered cylinders. For purposes of illustration, a piston ring 11 of the oil control type is shown mounted in one of the ring grooves 12 of a piston 13 and as having the usual ventilating ports or slots 14 and a pair of external, peripheral edges or surfaces 15 for contact with a cylinder wall 16 (FIG. 2). It is noted, however, that the ring 11 may have only one cylinder-contacting surface 15 and that the expander is adapted to coact with compression rings as well as oil control rings. As shown by the numeral 17, the ring is split in the usual manner for insertion in the ring groove 12 and the expander is adapted to be confined in said groove between its bottom or inner wall 18 and said ring. The combined radial thickness of the expander and ring is less than the depth of the groove so that said expander is spaced from and does not bear against the bottom 18.

The expander 10 is formed of a flat band or ribbon 19 of spring steel or other resilient metal which is oblong in cross-section and has its major dimension extending radially or transversely and perpendicular to its minor dimension. In addition to being annular for conforming to the contour of the piston ring, the ribbon 19 is split for insertion in the ring groove and has coacting end portions in the form of flat tabs 20 which are adapted to nest or overlap. As shown in FIG. 3, the tabs 20 extend substantially axially or uprightly at an inclination to the vertical. The ribbon is bent back and forth upon itself across its major cross-sectional dimension to provide axial convolutions or corrugations 21, which are of uniform height and width and have alternating curved portions or crests 22 and 23, whereby the expander is axially corrugated. As shown most clearly in FIG. 4, each of the crests 22 and 23 is curved in a single arc about a fixed axis and is connected to adjacent, opposed crests by substantially axial or upright, medial, short legs or straight portions 24. It is noted that the legs 24 are non-parallel and diverge slightly from the crests 23 to the crests 22 whereby said legs do not extend absolutely axially. In order to provide the inclined end tabs 20, the ribbon 19 has end convolutions or corrugations 25 terminating in straight portions or legs which form said tabs and which are bent inwardly toward the legs of the adjacent corrugations 21.

The axial dimension or height of the axially corrugated expander 10 is substantially equal to the axial dimension of the piston ring 11 whereby the crests 22 and 23 are substantially flush with the radial surfaces of said ring. This axial dimension is slightly less than the axial width of the ring groove so that the crests may engage either radial surface of said groove without bearing against its opposite surface (FIG. 2). The relaxed or unrestrained circumferential dimension of the expander is sufficiently larger than the inner circumference of the piston ring when said ring is constricted to the diameter of the cylinder 16, whereby the convolutions or corrugations of the expander are compressed sufficiently to cause said expander to bear against the inner peripheral surface of said ring with a uniformly distributed or equalized outward radial force or thrust for expanding said ring into conforming contact with the cylinder wall. In addition to being uniformly distributed circumferentially of the ring, the radial pressure exerted by the expander is applied equally to the upper and lower or radial portions of said ring due to said expander of substantially the same axial dimension.

This equal application of pressure is particularly beneficial when the ring has a pair of cylinder wall contacting surfaces 15. When the ring is sufficiently flexible, it conforms to the contour of a cylinder which is out of round and/or tapered due to the equalized radial thrust of the expander. Although the expander is flexible and conformable with the cylinder contour, its strength is increased without impairing its resiliency by its radial dimension being much greater than the minor cross-sectional dimension of its ribbon 19. Of course, the axial dimension or height of the corrugated expander is much greater than its radial dimension or width and the latter is greater than one-half the radial clearance between the ring and groove bottom 18 so that the end portions or tabs 20 cannot pass each other. The tabs remain in alinement due to the compression of the expander by the constriction of the piston ring by the cylinder wall. It is noted that the overlapping tabs facilitate installation of the expander and ring and provide greater stability than free or unconnected end portions which are subject to distortion.

Although the corrugations 21 are of uniform height and width or have uniform axial and circumferential dimensions, the cycle of said corrugations is of a length approximately one-third greater than the axial dimension of the expander. This height to pitch ratio of the corrugations, which may be of the order of 1 to 1.33, minimum, reduces the obstruction to the flow of oil through ventilated rings and renders the manufacture of the expander more economical since less material, labor and tooling are required. For the same reasons, the non-parallel legs 24 are preferred over absolutely axial legs. It is pointed out that the desired elasticity or deflection of the expander is obtained by this height to pitch ratio without the use of excessive material and undue cost of manufacture. While retaining sufficient strength, the flexibility or conformability of the expander is increased for accommodating variations in the contour and/or diameter of the cylinder or in the flexibility or radial width of the piston ring whereby the contact pressure between the cylinder wall and ring remains substantially constant or unchanged. In addition to providing a uniform distribution of outward radial force or thrust throughout a long period of use, the expander has minimum tension when cold and maximum tension under normal operating conditions.

Although the curved portions or crests 22 and 23 of the corrugations 21 are desirable, several advantages may be obtained by flattening the crests. A modified expander 30 is shown in FIG. 5 and includes axial convolutions or corrugations 31 which are uniform in height and width and have alternating crests 32 and 33 connected by legs or straight portions 34 similar to the legs 24. As shown by the numeral 35, the medial portions of the crests 32 and 33 are flat or straight and parallel and are connected to the legs 34 by arcuate or curved portions 36. The flat crests provide greater clearance for the flow of oil through ventilated rings and greater area for contact with the radial surfaces of the piston ring groove 12 whereby the modified expander has longer wear characteristics and less tendency to beat grooves in said radial surfaces. The length of the cycle of the corrugations 31 is approximately one-third greater than the axial dimension of the expander, or the height to pitch ratio of said corrugations is of the order of 1 to 1.33, minimum. With the exception of the flat portions 35 of the crests, the modified expander is of substantially the same construction as the expander 10 and functions in substantially the same manner.

In some installations, it is desirable to connect the end portions of the expander against radial movement relative to each other whereby the radial width of said expander may be less than one-half the radial clearance between the piston and ring groove bottom 18. A modified expander 40 is shown in FIGS. 6 and 7 and may be identical to the expander 10 except for the tabs 20 and end corrugations. Instead, each end portion is bifurcated or split longitudinally and preferably medially at 41 (FIG. 7) to provide an axial, flat tab 42 of approximately one-half the radial width of the expander. The tabs 42 extend in opposite directions and are complementary for free abutment or engagement. A lug or hook 43, which is preferably curved outwardly from each end portion, is formed by the remainder of the end portion and projects beyond the tab 42 for engagement with the lug of the other end portion. It is noted that the axial surfaces of the lugs 43 engage the axial surfaces of the abutting tabs to prevent radial movement of the end portions relative to each other. When connected in this manner, the end portions of the expander are prevented from becoming distorted as is possible with freely abutting ends due to rather high unit bearing stress. The pressure created by the compression of the expander to its operating diameter is applied to the corrugations adjacent the end portions as well as to said end portions and eliminates the possibility of distortion of the bearing or supporting areas of said expander. Manifestly, installation is easier when the end portions of the expander are connected against radial displacement since it is unnecessary to secure or hold said end portions against displacement. Also, the connected end portions eliminate the gouging of ring lands and groove surfaces by the free ends becoming caught under rings during installation. Likewise, the connected end portions cannot bypass each other and jam or wedge or otherwise slip out of position and cause malfunctioning.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. A circumferentially compressible piston ring expander including a split annular axially corrugated ribbon of resilient metal, the corrugations being substantially uniform and having a minimum axial height to pitch ratio of approximately 1 to 1.33, the ribbon having complementary overlapping end portions, each end portion including tabs of less radial thickness than the ribbon for abutment with each other, each end portion having means projecting beyond its tab for engaging an axial surface of the other tab to prevent relative radial movement of the end portion.

2. A circumferentially compressible piston ring expander including a split anular axially corrugated substantially flat ribbon of resilient metal of oblong cross-section, the major dimension of the cross-section extending radially of the ribbon and its minor dimension perpendicular to said major dimension, the corrugations having crests of uniform height, the length of the cycle of said corrugations being approximately one-third greater than the axial dimension of the ribbon, said ribbon having alined overlapping end portions, the crest of the corrugations having flat medial portions, and wherein the end portions are split to provide tabs of less radial thickness than the ribbon for abutting each other, the remainder of each end portion projecting beyond its tab for engaging an axial surface of the tab of the other end portion to prevent relative radial movement of said end portions.

3. A circumferentially compressible piston ring expander including a split annular axially corrugated ribbon of resilient material, and including tabs of less radial thickness than the ribbon on its end portions for abutment with each other, each end portion having means projecting beyond its tab for engaging an axial surface of the other tab to prevent relative radial movement of the end portions.

References Cited in the file of this patent

UNITED STATES PATENTS

| | | |
|---|---|---|
| 2,293,450 | Wilkening | Aug. 18, 1942 |
| 2,299,399 | Lane | Oct. 20, 1942 |
| 2,771,329 | Braendel | Nov. 20, 1956 |
| 2,854,301 | Lutz | Sept. 30, 1958 |
| 2,891,831 | Baker | June 23, 1959 |